US012625045B2

(12) United States Patent
Ji et al.

(10) Patent No.: US 12,625,045 B2
(45) Date of Patent: May 12, 2026

(54) BONDING STATE INSPECTION APPARATUS AND BONDING STATE INSPECTION METHOD USING THE SAME

(71) Applicant: LG ENERGY SOLUTION, LTD., Seoul (KR)

(72) Inventors: Hyun Jin Ji, Daejeon (KR); Seok Won Jeung, Daejeon (KR); Hyun Min Oh, Daejeon (KR); Geon Tae Park, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 270 days.

(21) Appl. No.: 18/288,145

(22) PCT Filed: Nov. 21, 2022

(86) PCT No.: PCT/KR2022/018389
§ 371 (c)(1),
(2) Date: Oct. 24, 2023

(87) PCT Pub. No.: WO2023/101287
PCT Pub. Date: Jun. 8, 2023

(65) Prior Publication Data
US 2024/0210293 A1       Jun. 27, 2024

(30) Foreign Application Priority Data
Dec. 1, 2021     (KR) ........................ 10-2021-0169950

(51) Int. Cl.
*G01J 5/08*          (2022.01)
*G01N 3/06*          (2006.01)
(Continued)

(52) U.S. Cl.
CPC .............. *G01N 3/24* (2013.01); *G01J 5/0859* (2013.01); *G01N 3/06* (2013.01); *H01M 10/482* (2013.01); *G01J 2005/0077* (2013.01)

(58) Field of Classification Search
CPC ............ G01J 5/08; G01J 5/0859; G01N 3/24
See application file for complete search history.

(56) References Cited

U.S. PATENT DOCUMENTS

2002/0166802 A1    11/2002  Jung et al.
2008/0190212 A1     8/2008  Sykes
(Continued)

FOREIGN PATENT DOCUMENTS

CN        109540967 A  *  3/2019  ............. G01N 25/72
JP        2003149132 A  *  5/2003
(Continued)

OTHER PUBLICATIONS

Morita et al., Evaluation Method for Semiconductor Device Junction Strength and Evaluation Device and Semiconductor Device, May 2003, JPO Machine Translation (Year: 2003).*
(Continued)

*Primary Examiner* — Erika J. Villaluna
(74) *Attorney, Agent, or Firm* — Birch, Stewart, Kolasch & Birch, LLP

(57)                ABSTRACT

Discussed is a bonding state inspection apparatus and a bonding state inspection method using the apparatus, and more particularly to a bonding state inspection apparatus including a transfer unit configured to transfer a battery module having a plurality of battery cells received therein, a thermal image inspection unit configured to scan an upper surface of the battery module, and a shear inspection unit configured to apply a shear force to a bonding ball formed at the battery module and a bonding state inspection method using the same.

13 Claims, 5 Drawing Sheets

(51) Int. Cl.
   *G01N 3/24*     (2006.01)
   *H01M 10/48*   (2006.01)
   *G01J 5/00*     (2022.01)

(56)        References Cited

U.S. PATENT DOCUMENTS

| | | |
|---|---|---|
| 2010/0116063 A1 | 5/2010 | Sykes |
| 2021/0184280 A1 | 6/2021 | Kim et al. |
| 2022/0357294 A1 | 11/2022 | Joung et al. |
| 2023/0406619 A1 | 12/2023 | Lee et al. |

FOREIGN PATENT DOCUMENTS

| | | |
|---|---|---|
| JP | 2004-311623 A | 11/2004 |
| JP | 2007-538242 A | 12/2007 |
| JP | 4242086 B2 | 3/2009 |
| JP | 2009-526987 A | 7/2009 |
| JP | 5060494 B2 | 10/2012 |
| JP | 2016-77082 A | 5/2016 |
| JP | 2018-10770 A | 1/2018 |
| JP | 6631482 B2 | 1/2020 |
| JP | 2023-550369 A | 12/2023 |
| KR | 10-2002-0085266 A | 11/2002 |
| KR | 10-2008-0109947 A | 12/2008 |
| KR | 10-1909861 B1 | 10/2018 |
| KR | 10-1977305 B1 | 5/2019 |
| KR | 10-2072481 B1 | 2/2020 |
| KR | 10-2021-0065297 A | 6/2021 |
| KR | 10-2294189 B1 | 8/2021 |
| KR | 10-2021-0127034 A | 10/2021 |

OTHER PUBLICATIONS

Wang et al., Welding Quality Detection System and Method; Mar. 2019, FIT Machine Translation (Year: 2019).*
Extended European Search Report for European Application No. 22901645.6, dated Mar. 12, 2025.
International Search Report (PCT/ISA/210) issued in PCT/KR2022/018389 mailed on Mar. 3, 2023.

* cited by examiner

【FIG. 1】
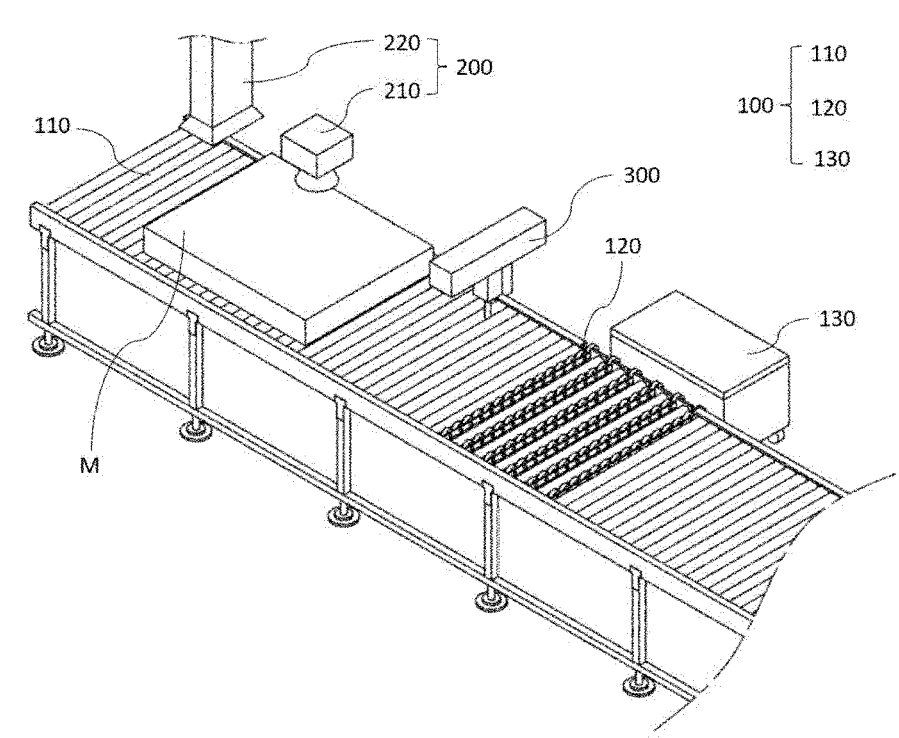
【FIG. 2】
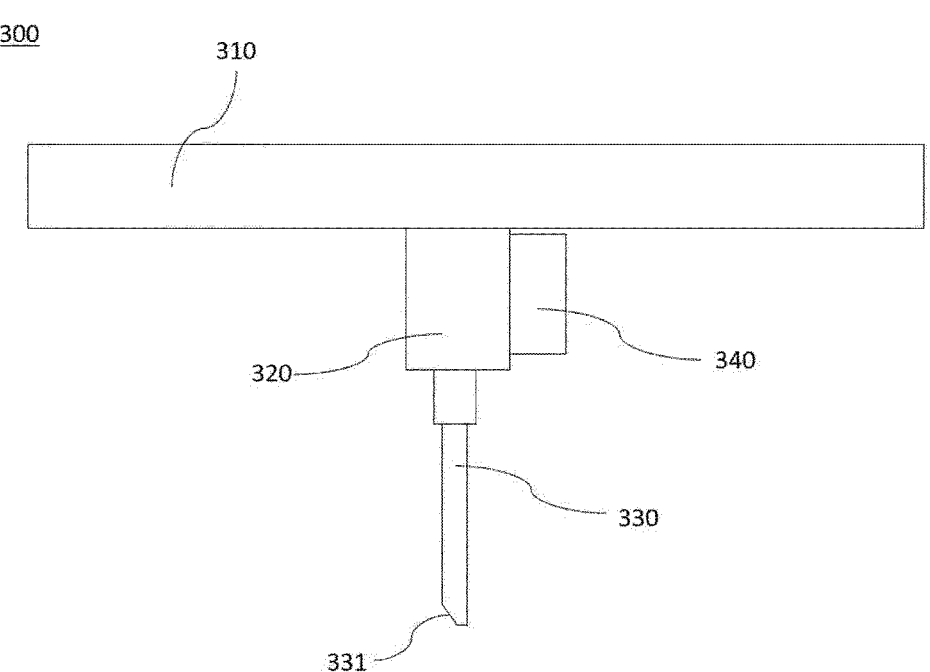

【FIG. 3】
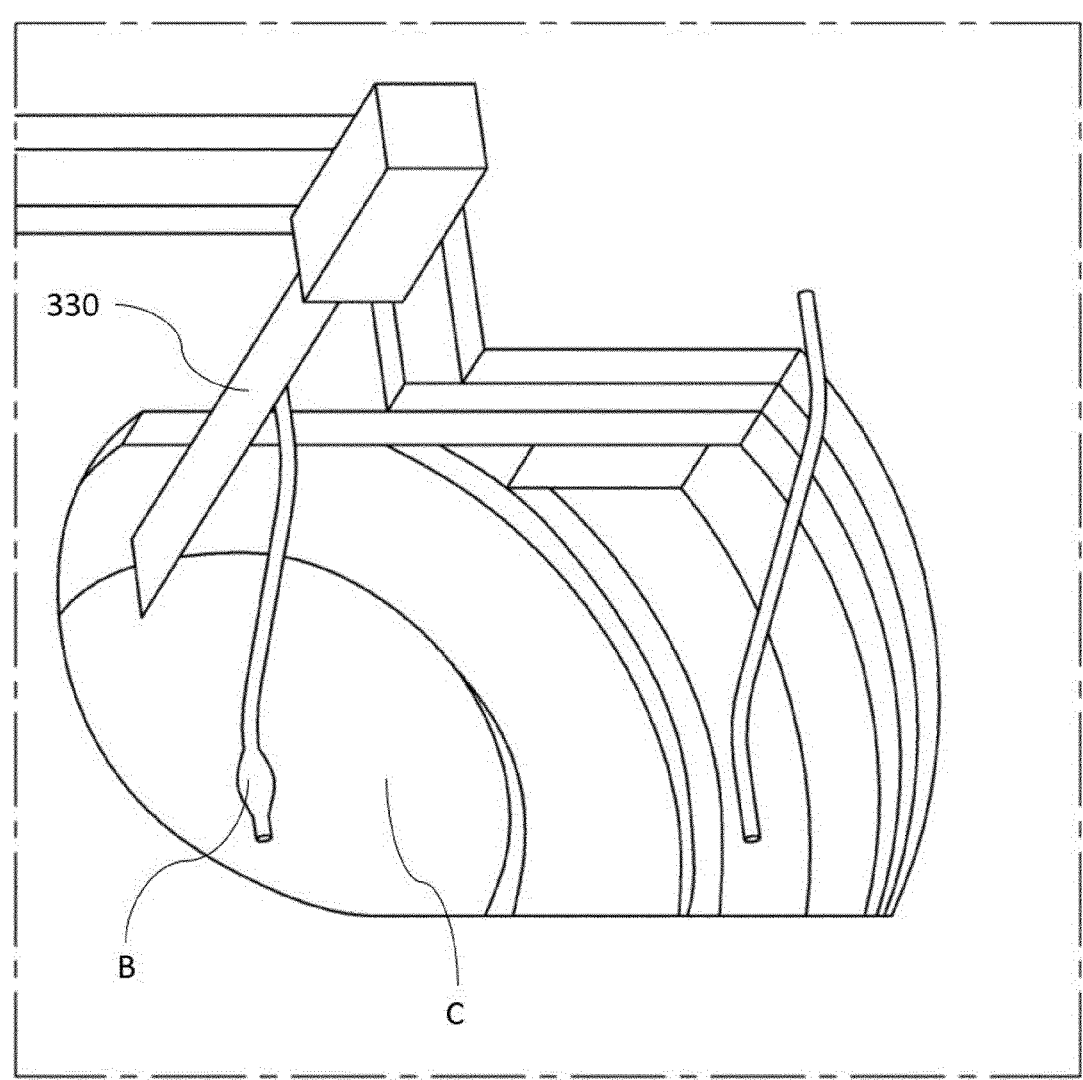

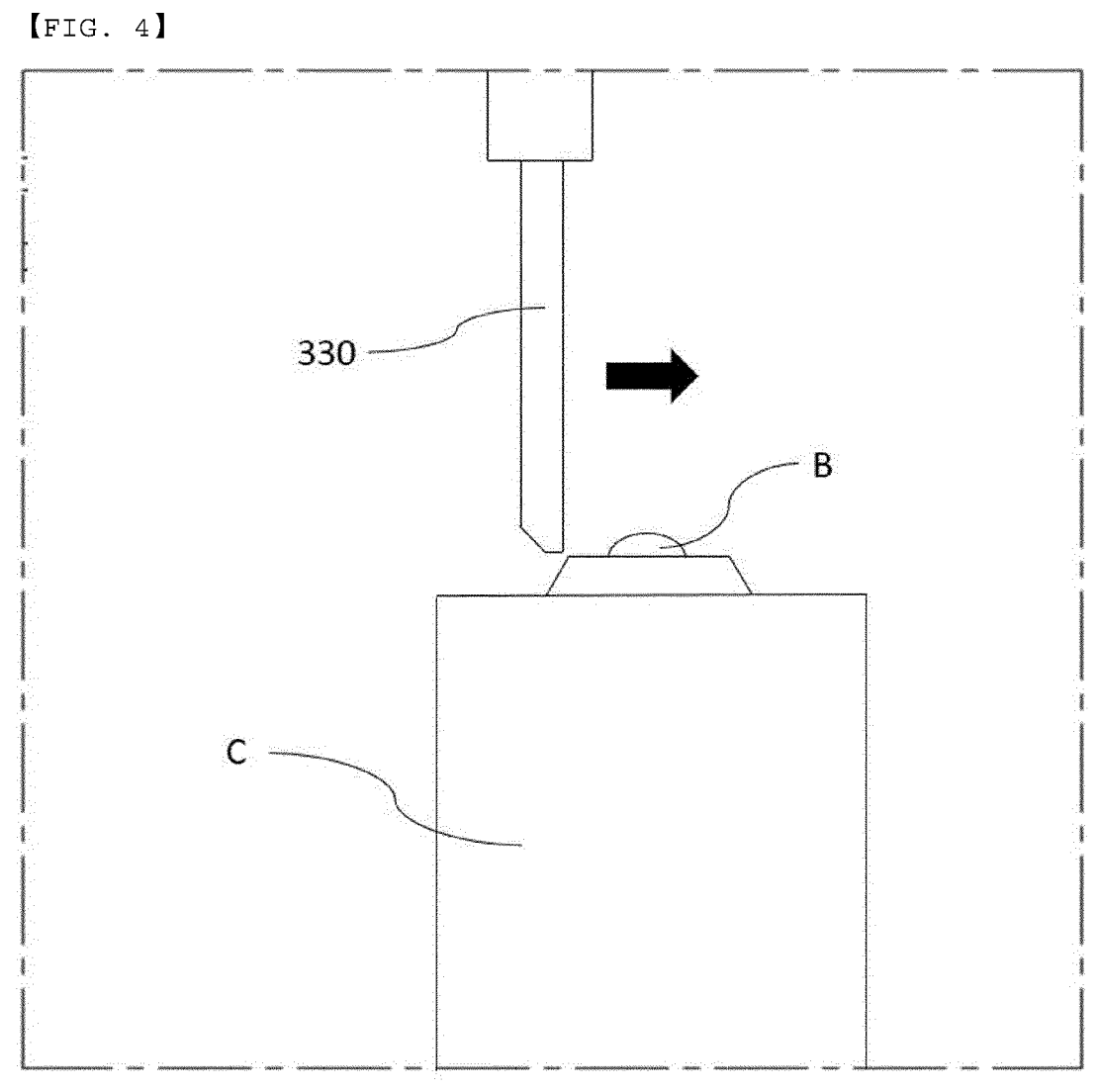

【FIG. 4】

【FIG. 5】
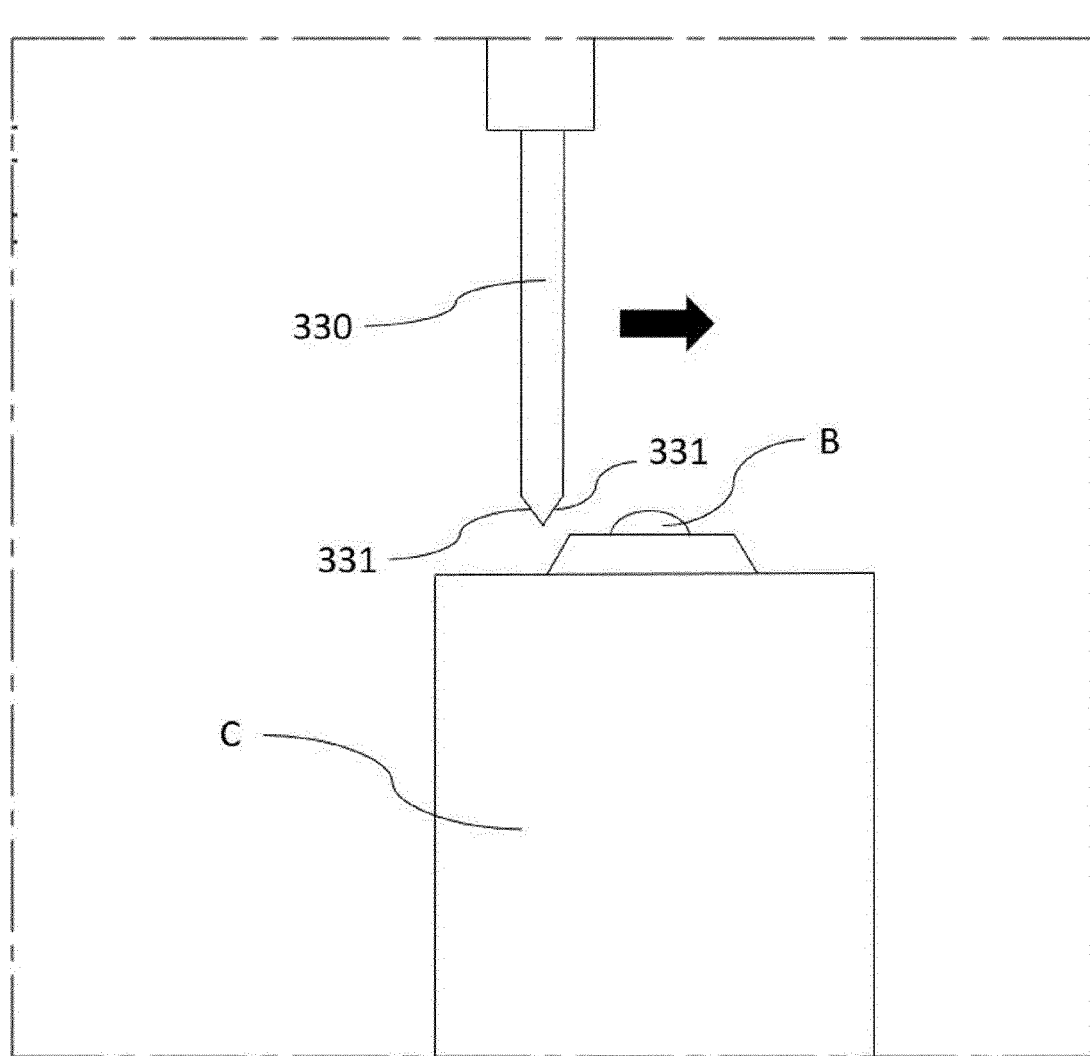

【FIG. 6】
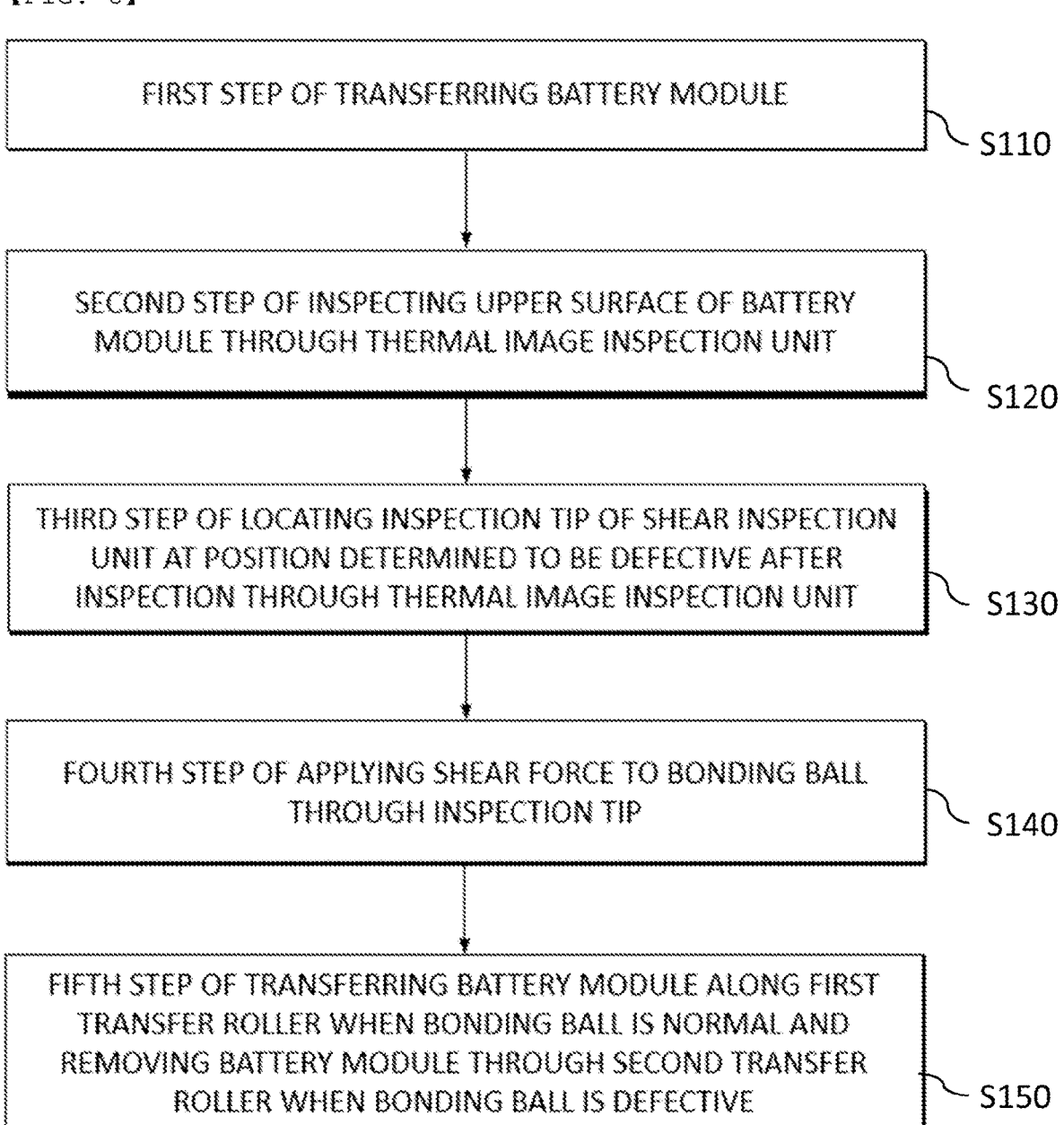

BONDING STATE INSPECTION APPARATUS AND BONDING STATE INSPECTION METHOD USING THE SAME

TECHNICAL FIELD

This application claims the benefit of priority to Korean Patent Application No. 2021-0169950 filed on Dec. 1, 2021, the disclosure of which is incorporated herein by reference in its entirety.

The present invention relates to a bonding state inspection apparatus and a bonding state inspection method using the same, and more particularly to a bonding state inspection apparatus capable of continuously inspecting a bonding state through automation, thereby improving work efficiency, and a bonding state inspection method using the same.

BACKGROUND ART

With recent development of alternative energies due to air pollution and energy depletion caused as the result of use of fossil fuels, demand for secondary batteries capable of storing electrical energy that is produced has increased. Secondary batteries, which are capable of being charged and discharged, are widely intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, a secondary battery exhibits excellent electrical properties; however, there are problems in that an active material and an electrolyte, which are components of battery, the are decomposed, thus generating heat and gas, in an abnormal operation state, such as overcharging, overdischarging, exposure to a high temperature, and electrical short circuit, whereby a battery cell adjacent thereto is affected, and therefore additional secondary damage occurs.

For these reasons, accurate inspection of a bonding state of the secondary battery with improve process efficiency is required in order to improve safety of the secondary battery during a manufacturing process and to reduce defects.

In conventional bonding state inspection, electrical connection between battery cells in a battery module or a battery pack is performed by wire bonding, and whether a bonding state is defective is determined through thermal image inspection.

In addition, for the bonding determined to be defective as the result of the thermal image inspection, a worker directly checks the bonding position in a subsequent process. When the number of battery cells received in the battery module or the battery pack is increased, however, it is difficult for the worker to directly check the bonding position, whereby worker fatigue is accumulated and reliability and accuracy are deteriorated.

Prior Art Document (Patent Document 1) Korean Patent Application Publication No. 2021-0065297

DISCLOSURE

Technical Problem

The present invention has been made in view of the above problems, and it is an object of the present invention to provide a bonding state inspection apparatus capable of improving d reliability through automation of a bonding state inspection process and a bonding state inspection method using the same.

It is another object of the present invention to provide a bonding state inspection apparatus capable of applying shear force to a bonding ball after thermal image inspection to continuously perform defect inspection, thereby improving process efficiency, and a bonding state inspection method using the same.

Technical Solution

A bonding state inspection apparatus according to the present invention to accomplish the above objects includes a transfer unit configured to transfer a battery module having a plurality of battery cells received therein, a thermal image inspection unit configured to scan an upper surface of the battery module, and a shear inspection unit configured to apply a shear force to a bonding ball formed at the battery module.

Also, in the bonding state inspection apparatus according to the present invention, the transfer unit may include a first transfer roller configured to transfer the battery module, a second transfer roller configured to change the movement direction of the battery module transferred by the first transfer roller, and a transfer cart configured to allow the battery module transferred by the second transfer roller to be seated therein.

Also, in the bonding state inspection apparatus according to the present invention, the transfer direction of the first transfer roller and the transfer direction of the second transfer roller may be different from each other.

Also, in the bonding state inspection apparatus according to the present invention, the thermal image inspection unit may include a photographing portion constituted by a thermal imaging camera and an illuminating portion located spaced apart from the photographing portion by a predetermined distance.

Also, in the bonding state inspection apparatus according to the present invention, the shear inspection unit may include a moving shaft having a predetermined length, a body portion located under the moving shaft, an inspection tip provided at a lower surface of the body portion, and a displacement sensor provided at a side surface of the body portion.

Also, in the bonding state inspection apparatus according to the present invention, the moving shaft may be located so as to have the predetermined length in a direction perpendicular to the transfer direction of the battery module.

Also, in the bonding state inspection apparatus according to the present invention, the moving shaft may be movable in a direction parallel to the transfer direction of the battery module and in a direction perpendicular to the transfer direction of the battery module, and the body portion may be movable in a longitudinal direction of the moving shaft.

Also, in the bonding state inspection apparatus according to the present invention, the inspection tip may include an insulated metal material.

Also, in the bonding state inspection apparatus according to the present invention, an inclined portion inclined at a predetermined angle may be formed at a lower part of the inspection tip.

In addition, a bonding state inspection method according to the present invention includes a first operation of transferring a battery module, a second operation of inspecting an upper surface of the battery module through the thermal image inspection unit, a third operation of locating the inspection tip of the shear inspection unit at a position determined to be defective after inspection through the thermal image inspection unit, a fourth operation of applying the shear force to the bonding ball through the inspection tip, and a fifth operation of transferring the battery module along a first transfer roller when the bonding ball is normal and removing the battery module through a second transfer roller when the bonding ball is defective.

Also, the bonding state inspection method according to the present invention may further include an operation of charging and discharging the battery module before the second operation.

Also, in the bonding state inspection method according to the present invention, in the third operation, the inspection tip may be located spaced apart from a side of the bonding ball by a predetermined distance.

Also, in the bonding state inspection method according to the present invention, in the fourth operation, the shear force may be applied to a side surface of the bonding ball.

Advantageous Effects

As is apparent from the above description, a bonding state inspection apparatus according to the present invention and a bonding state inspection method using the same have an advantage in that primary inspection by a thermal image inspection unit and secondary inspection by a shear inspection unit are successively performed, whereby process efficiency is improved.

In addition, the bonding state inspection apparatus according to the present invention and the bonding state inspection method using the same have an advantage in that bonding state inspection is automated by the apparatus, whereby accuracy is improved and process time is reduced.

DESCRIPTION OF DRAWINGS

FIG. 1 is a perspective view showing a bonding state inspection apparatus according to a first preferred embodiment of the present invention.

FIG. 2 is a plan view of a shear inspection unit according to a first preferred embodiment of the present invention when viewed from the front.

FIG. 3 is a perspective view showing the state in which an inspection tip according to a first preferred embodiment of the present invention is located at a side of a bonding ball.

FIG. 4 is a plan view showing the state in which the inspection tip according to the first preferred embodiment of the present invention is located at the side of the bonding ball.

FIG. 5 is a plan view showing the state in which an inspection tip according to a second preferred embodiment of the present invention is located at the side of the bonding ball.

FIG. 6 is a flowchart showing a bonding state inspection method according to a preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a bonding state inspection apparatus according to the present invention and a bonding state inspection method using the same will be described with reference to the accompanying drawings.

FIG. 1 is a perspective view showing a bonding state inspection apparatus according to a first preferred embodiment of the present invention, FIG. 2 is a plan view of a shear inspection unit according to a first preferred embodiment of the present invention when viewed from the front, FIG. 3 is a perspective view showing the state in which an inspection tip according to a first preferred embodiment of the present invention is located at a side of a bonding ball, and FIG. 4 is a plan view showing the state in which the inspection tip according to the first preferred embodiment of the present invention is located at the side of the bonding ball.

Referring to FIGS. 1 to 4, the bonding state inspection apparatus according to the present invention includes a transfer unit 100, a thermal image inspection unit 200, and a shear inspection unit 300.

First, the transfer unit 100 includes a first transfer roller 110, a second transfer roller 120, and a transfer cart 130.

The first transfer roller 110, which is constituted by a plurality of rollers, transfers a battery module M seated on the first transfer roller 110 to a position at which a process and inspection are performed.

Here, the battery module M may include a plurality of cylindrical battery cells C and a module case configured to receive the plurality of cylindrical battery cells C.

Each of the cylindrical battery cells C includes a cell case configured to receive an electrode assembly, the cell case being electrically connected to a negative electrode lead of the electrode assembly, and a top cap located at an upper part of the cell case.

The top cap is not electrically conducted to the cell case due to an insulation member (not shown) and is electrically connected to a positive electrode lead of the electrode assembly, whereby the top cap functions as a positive electrode terminal.

An upper surface of the cell case is located along an outer circumference of the top cap in the state in which the insulation member is interposed between the cell case and the top cap such that the cell case and the top cap are fixed to each other. It is preferable for the top cap to protrude farther than the upper surface of the cell case, and it is more preferable for a positive electrode terminal protruding upwards to be further provided at the center of the top cap.

Meanwhile, the electrode assembly include a cell assembly and a lead, and the cell assembly may be a jelly-roll type cell assembly, which is configured to have a structure in which a long sheet type positive electrode and a long sheet type negative electrode are wound in the state in which a separator is interposed therebetween, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other; however, the present invention is not limited thereto.

For a pair of leads constituted by a positive electrode lead and a negative electrode lead, the positive electrode of the cell assembly and the top cap are directly or indirectly connected to each other via the positive electrode lead, and the negative electrode lead is electrically connected to the cell case. The electrode assembly constituting the cylindrical battery cell described above is a generally known construction, and therefore a more detailed description thereof will be omitted.

Next, the second transfer roller 120 is located in a direction perpendicular to the first transfer roller 110 and is located behind the vertical position of the shear inspection unit 300, whereby it is possible to change a movement path for the battery module M determined to be defective as the result of inspection performed by the shear inspection unit 300.

Here, the second transfer roller 120 may be formed between the plurality of rollers of the first transfer roller 110 and may be moved upwards and downwards by a predetermined distance in a vertical direction. At ordinary times, the second transfer roller may be in a descent state, and when change of the movement path for the battery module M determined to be defective is necessary, the second transfer roller may be moved upwards, may transfer the battery module, and may be moved downwards.

The transfer cart 130 allows the battery module M deviating from the movement path of the first transfer roller 110 by the second transfer roller 120 to be seated thereon such that the battery module is excluded from a manufacturing process. The transfer cart may be a shelf or support with wheels; however, the shape of the transfer cart is not particularly restricted as long as t is possible to exclude the battery module M transferred by the second transfer roller 120 from the manufacturing process.

Next, the thermal image inspection unit 200 includes a photographing portion 210 and an illuminating portion 220.

The photographing portion 210 may be a thermal imaging camera, and scans an upper surface of the battery module M transferred along an upper surface of the first transfer roller 110 to measure the temperature of bonding balls B, and transmits the position of any bonding ball B deviating from a normal range to a control device.

The illuminating portion 220 is provided at a position horizontally parallel to the photographing portion 210 so as to be spaced apart therefrom by a predetermined distance, and illuminates the upper surface of the battery module M such that the photographing portion 210 can more accurately measure the temperature of the bonding balls B.

The shear inspection unit 300 includes a moving shaft 310, a body portion 320, an inspection tip 330, and a displacement sensor 340.

The moving shaft 310 has a predetermined length in a direction perpendicular to the battery module M and is located above the first transfer roller 110. The moving shaft 310 may be moved in a direction parallel to a transfer direction of the battery module M and in a direction perpendicular to the transfer direction of the battery module.

The body portion 320 is attached to a lower surface of the moving shaft 310 so as to be movable in a longitudinal direction of the moving shaft 310. The body portion 320 may be moved by the moving shaft 310 in a forward-rearward direction, a leftward-rightward direction, and an upward-downward direction.

The inspection tip 330 may be a post protruding from a lower surface of the body portion 320 by a predetermined length. It is preferable for an inclined portion 331 inclined at a predetermined angle to be formed at a lower part of the inspection tip 330. The reason for this is that, when the inspection tip is moved downwards in order to apply shear force to the bonding ball B, it is possible to prevent contact between the inspection tip and another component, such as a busbar.

Also, it is preferable for the inspection tip 330 to be made of an insulated metal material. The reason for this is that, when shear force is applied to the bonding ball B, it is possible to prevent the occurrence of short circuit as the result of electrical conduction due to contact.

The displacement sensor 340 may be located at a side surface of the body portion 320 and may measure the distance from the battery module M to prevent downward movement of the inspection tip 330 more than necessary, thereby preventing pressure from being applied to a battery cell C. The displacement sensor 340 may be a laser displacement sensor; however the displacement sensor is not particularly restricted as long as it is possible to recognize the distance between the inspection tip 330 and the battery cell C.

FIG. 5 is a plan view showing the state in which an inspection tip according to a second preferred embodiment of the present invention is located at the side of the bonding ball.

Referring to FIG. 5, the bonding state inspection apparatus according to the second preferred embodiment of the present invention is identical in construction to the bonding state inspection apparatus according to the first embodiment described with reference to FIGS. 1 to 4 except for the shape of a lower part of the inspection tip, and therefore a description of the identical components will be omitted.

In the inspection tip 330 according to the second preferred embodiment of the present invention, an inclined portion 331 inclined at a predetermined angle is formed at each of opposite sides of a lower part of the inspection tip 330. When the inspection tip 330 is moved downwards and is located at set coordinates, therefore, it is possible to prevent contact between the inspection tip and another component, such as the busbar or the module case, in opposite directions.

FIG. 6 is a flowchart showing a bonding state inspection method according to a preferred embodiment of the present invention.

Referring to FIG. 6, the bonding state inspection method according to the preferred embodiment of the present invention includes a first step or operation S110 of transferring a battery module M, a second step or operation S120 of inspecting an upper surface of the battery module M through the thermal image inspection unit 200, a third step or operation S130 of locating the inspection tip 330 of the shear inspection unit 300 at a position determined to be defective after inspection through the thermal image inspection unit 200, a fourth step or operation S140 of applying shear force to a bonding ball B through the inspection tip 330, and a fifth step or operation S150 of transferring the battery module M along the first transfer roller 110 when the bonding ball B is normal and removing the battery module through the second transfer roller 120 when the bonding ball is defective.

The first step of transferring the battery module M is a step of transferring the battery module M to an inspection position through the first transfer roller 110 in order to inspect the battery module.

The second step of inspecting the upper surface of the battery module M through the thermal image inspection unit 200 is a step of scanning the upper surface of the battery module M when the transferred battery module M passes under the photographing portion 210 to measure the temperature of the bonding ball B in order to determine whether the bonding ball is defective.

Here, the battery module M is charged and discharged before the second step, whereby the temperature of the bonding ball B is increased. The temperature of the bonding ball B having the increased temperature is measured by the photographing portion 210, and the measured temperature of the bonding ball is compared with the temperature of the bonding ball B before charging and discharging to calculate the difference between the temperature before charging and discharging and the temperature after charging and discharging.

Whether the bonding ball B is defective is determined by checking whether the temperature difference of the bonding ball is within a normal range. At this time, when the temperature difference of the bonding ball B in a normal state is 0.66° C. to 1.38° C. for the positive electrode and 1.59° C. to 3.19° C. for the negative electrode at the time of charging and 1.12° C. to 2.27° C. for the positive electrode at the time of discharging, it may be determined that the bonding ball is normal.

In addition, when the temperature difference is 1.12° ° C. to 2.27° ° C. for the positive electrode and 0.88° C. to 2.20° ° C. for the negative electrode at the time of discharging, it may be determined that the bonding ball is normal.

When the bonding ball is defective, e.g. when bonding is not performed, less than the lower limit of the temperature difference may be measured, and when weak bonding is performed, greater than the upper limit of the temperature difference may be measured.

Here, the temperature difference within the normal range is a value that can be changed depending on the kind of the battery module and electric power at the time of charging and discharging.

The third step of locating the inspection tip 330 of the shear inspection unit 300 at the position determined to be defective after inspection through the thermal image inspection unit 200 is a step of locating the inspection tip 330 at the side of the bonding ball B determined to be defective in the second step so as to be spaced apart therefrom by a predetermined distance.

The fourth step of applying shear force to the bonding ball B through the inspection tip 330 is a step of moving the inspection tip 330 located at the side of the bonding ball B in the third step in a direction toward the bonding ball B and applying shear force to a side surface of the bonding ball B to determine whether the bonding ball is defective.

The fifth step of transferring the battery module M using the first transfer roller 110 when the bonding ball B is normal and removing the battery module using the second transfer roller 120 when the bonding ball is defective is a step of transferring the battery module M using the first transfer roller 110 when the bonding ball is normal after shear inspection in the fourth step and deviating the battery module M from a transfer direction of the first transfer roller 110 using the second transfer roller 120 so as to be seated in the transfer cart 130 and to be removed from the manufacturing process when the bonding ball is defective.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Transfer unit
110: First transfer roller
120: Second transfer roller
130: Transfer cart
200: Thermal image inspection unit
210: Photographing portion
220: Illuminating portion
300: Shear inspection unit
310: Moving shaft
320: Body portion
330: Inspection tip
331: Inclined portion
340: Displacement sensor
M: Battery module
C: Battery cell
B: Bonding ball

The invention claimed is:
1. A bonding state inspection apparatus comprising:
a transfer unit configured to transfer a battery module having a plurality of battery cells received therein;
a thermal image inspection unit configured to scan an upper surface of the battery module; and
a shear inspection unit configured to apply a shear force to a bonding ball formed at the battery module,
wherein the shear inspection unit comprises:
a moving shaft having a predetermined length;
a body portion located under the moving shaft;
an inspection tip provided at a lower surface of the body portion; and
a displacement sensor provided at a side surface of the body portion,
wherein the moving shaft is movable in a direction parallel to a transfer direction of the battery module and in a direction perpendicular to the transfer direction of the battery module,
wherein both the transfer direction and the direction perpendicular to the transfer direction are parallel with the upper surface of the battery module, and
wherein the transfer direction of the battery module is parallel to an extending direction of the transfer unit.
2. The bonding state inspection apparatus according to claim 1, wherein the transfer unit comprises:

a first transfer roller configured to transfer the battery module;

a second transfer roller configured to change a movement direction of the battery module transferred by the first transfer roller; and a transfer cart configured to allow the battery module transferred by the second transfer roller to be seated therein.

3. The bonding state inspection apparatus according to claim 2, wherein a transfer direction of the first transfer roller and a transfer direction of the second transfer roller are different from each other.

4. The bonding state inspection apparatus according to claim 1, wherein the thermal image inspection unit comprises:

a photographing portion constituted by a thermal imaging camera; and an illuminating portion located spaced apart from the photographing portion by a predetermined distance.

5. The bonding state inspection apparatus according to claim 1, wherein the moving shaft is located so as to have the predetermined length in a direction perpendicular to the transfer direction of the battery module.

6. The bonding state inspection apparatus according to claim 5, wherein the body portion is movable in a longitudinal direction of the moving shaft.

7. The bonding state inspection apparatus according to claim 1, wherein the inspection tip includes a metal material having an insulation layer so as to prevent an occurrence of a short circuit due to contact.

8. The bonding state inspection apparatus according to claim 1, wherein an inclined portion inclined at a predetermined angle is formed at a lower part of the inspection tip.

9. A bonding state inspection method using the bonding state inspection apparatus according to claim 1, the bonding state inspection method comprising:

a first operation of transferring the battery module;

a second operation of inspecting the upper surface of the battery module through the thermal image inspection unit;

a third operation of locating an inspection tip of the shear inspection unit at a position determined to be defective after inspection through the thermal image inspection unit;

a fourth operation of applying the shear force to the bonding ball through the inspection tip; and a fifth operation of transferring the battery module along a first transfer roller when the bonding ball is normal and removing the battery module through a second transfer roller when the bonding ball is defective.

10. The bonding state inspection method according to claim 9, further comprising an operation of charging and discharging the battery module before the second operation.

11. The bonding state inspection method according to claim 9, wherein, in the third operation, the inspection tip is located spaced apart from a side of the bonding ball by a predetermined distance.

12. The bonding state inspection method according to claim 11, wherein, in the fourth operation, the shear force is applied to a side surface of the bonding ball.

13. The bonding state inspection apparatus according to claim 1, wherein the body portion is configured to be moved by the moving shaft in a forward-rearward direction, a leftward-rightward direction, and an upward-downward direction.

* * * * *